United States Patent
Fuderer et al.

(10) Patent No.: US 10,718,392 B2
(45) Date of Patent: Jul. 21, 2020

(54) BRAKE LINING FOR A PARTIALLY LINED DISC BRAKE, ARRANGEMENT OF A BRAKE LINING ON A LINING HOLDER, AND METHOD FOR ACTUATING A BRAKE LINING HELD ON A LINING HOLDER

(71) Applicant: KNORR-BREMSE SYSTEME FÜR SCHIENENFAHRZEUGE GMBH, Munich (DE)

(72) Inventors: Erich Fuderer, Fürstenfeldbruck (DE); Marc-Gregory Elstorpff, München (DE); Michael Mathieu, Puchheim (DE); Marco Langwadt, München (DE); Alexander Jung, Gauting (DE)

(73) Assignee: KNORR-BREMSE SYSTEM FÜR SCHIENENFAHRZEUGE GMBH (DE)

( * ) Notice: Subject to any disclaimer, the term of this patent is extended or adjusted under 35 U.S.C. 154(b) by 295 days.

(21) Appl. No.: 15/538,980

(22) PCT Filed: Dec. 17, 2015

(86) PCT No.: PCT/EP2015/080123
§ 371 (c)(1),
(2) Date: Nov. 9, 2017

(87) PCT Pub. No.: WO2016/102285
PCT Pub. Date: Jun. 30, 2016

(65) Prior Publication Data
US 2018/0291972 A1    Oct. 11, 2018

(30) Foreign Application Priority Data
Dec. 23, 2014   (DE) .................. 10 2014 119 489

(51) Int. Cl.
*F16D 65/092*    (2006.01)
*B61H 5/00*    (2006.01)
(Continued)

(52) U.S. Cl.
CPC ............ *F16D 65/092* (2013.01); *B61H 5/00* (2013.01); *F16D 69/00* (2013.01); *F16D 69/04* (2013.01); *B61H 13/00* (2013.01); *F16D 65/0972* (2013.01)

(58) Field of Classification Search
CPC ..... F16D 65/092; F16D 69/04; F16D 69/0408
(Continued)

(56) References Cited

U.S. PATENT DOCUMENTS 4,501,347 A * 2/1985 Cerny ................. F16D 65/0006
                                                        188/250 G
5,538,108 A * 7/1996 Russo ................... F16D 65/092
                                                        188/250 E
(Continued)

FOREIGN PATENT DOCUMENTS

CN    101975234 A    2/2011
CN    102003482 A    4/2011
(Continued)

OTHER PUBLICATIONS

Search Report and Written Opinion for International Patent Application No. PCT/EP2015/080123 dated Apr. 22, 2016.

*Primary Examiner* — Christopher P Schwartz
(74) *Attorney, Agent, or Firm* — Barnes & Thornburg LLP

(57) ABSTRACT

An arrangement for a brake lining, method for actuating the brake lining and the brake lining itself are a partially lined disc brake of a rail vehicle that has a lining support and multiple group elements arranged on the lining support. Each of the group elements consists of a support plate and multiple lining elements arranged on the support plate, and lining elements with at least two friction surfaces of differing sizes are arranged on each support plate. The lining elements are arranged such that their total surface area at least approximates a ring sector, and at least two different first and second group elements are arranged on the lining support.

13 Claims, 5 Drawing Sheets

(51) Int. Cl.
*F16D 69/00* (2006.01)
*F16D 69/04* (2006.01)
*B61H 13/00* (2006.01)
*F16D 65/097* (2006.01)

(58) Field of Classification Search
USPC ............... 188/250 B, 250 G, 251 A, 251 M; 192/107 R, 107 M
See application file for complete search history.

(56) References Cited

U.S. PATENT DOCUMENTS

| | | | | |
|---|---|---|---|---|
| 5,934,418 | A * | 8/1999 | Wirth | F16D 65/0006 188/217 |
| 7,051,847 | B2 * | 5/2006 | Wirth | F16D 65/092 188/250 B |
| 7,648,007 | B2 * | 1/2010 | Russo | F16D 65/0006 188/250 E |
| 7,661,515 | B2 * | 2/2010 | Maehara | F16D 65/092 188/250 B |
| 8,215,461 | B2 * | 7/2012 | Holme | F16D 69/0408 188/250 G |
| 8,919,503 | B2 * | 12/2014 | Hiramatsu | B61H 5/00 188/250 B |
| 9,206,865 | B2 * | 12/2015 | Sigl | F16D 65/092 |
| 9,441,694 | B2 * | 9/2016 | Maehara | B61H 5/00 |
| 2018/0017123 | A1 * | 1/2018 | Elstorpff | B61H 5/00 |
| 2018/0266508 | A1 * | 9/2018 | Chen | F16D 65/847 |

FOREIGN PATENT DOCUMENTS

| | | |
|---|---|---|
| CN | 201810707 U | 4/2011 |
| CN | 201836269 U | 5/2011 |
| DE | 102005034861 A1 | 3/2009 |
| DE | 202012006261 U1 | 10/2013 |
| EP | 0784761 A1 | 7/1997 |
| EP | 1910702 A1 | 4/2008 |
| EP | 2713075 A1 | 4/2014 |

* cited by examiner

BRAKE LINING FOR A PARTIALLY LINED DISC BRAKE, ARRANGEMENT OF A BRAKE LINING ON A LINING HOLDER, AND METHOD FOR ACTUATING A BRAKE LINING HELD ON A LINING HOLDER

CROSS REFERENCE AND PRIORITY CLAIM

This patent application is a U.S. National Phase of International Patent Application No. PCT/EP2015/080123, filed 17 Dec. 2015, which claims priority to German Patent Application No. 102014119489.6, filed 23 Dec. 2014, the disclosures of which are incorporated herein by reference in their entirety.

FIELD

Disclosed embodiments relate to a brake lining for a partially lined disk brake of a rail vehicle, and more particularly to an arrangement of a brake lining of this type on a lining holder of a brake disk arrangement of a rail vehicle, and to a method for actuating a brake lining which is secured on a lining holder of a brake disk arrangement of a rail vehicle.

BACKGROUND

A brake lining of the generic type is described in EP 0 784 761 B1. In the case of the brake lining which is described therein, a very uniform input of heat into the brake disk of a disk brake is achieved by way of a division of the overall lining area into a plurality of small lining elements and by way of a statically determined transmission of a brake application force of a caliper lever of a disk brake of a rail vehicle to the lining elements.

Here, the force of the caliper lever is distributed uniformly to respective halves of a lining carrier, on which the lining elements are secured, by a lining holder, on which the brake lining is secured.

Here, that force of the caliper lever which acts on a half of this type of the lining carrier is supported via in each case three carrier plates which are mounted on the lining carrier. Here, the force is distributed in such a way that all the carrier plates are loaded uniformly. Each of the carrier plates in turn divides the force which is exerted by the caliper lever, once again in a uniform manner, to the lining elements which are mounted on a carrier plate of this type.

An arrangement of this type of a carrier plate with lining elements which are held thereon via spherical bearings will be called a group element in the following text.

The group elements and also the three lining elements of a group element of this type lie on different orbital path diameters in relation to the brake disk, against which the lining elements bear in the case of a braking operation.

As a result of the positioning of the lining elements on different orbital path cross sections, the sliding velocity of the lining elements on the brake disk is also of different magnitude.

Owing to the different sliding velocities, in the case of an identical surface pressure of the lining elements, wear of the lining elements at a different speed and therefore an oblique position of the carrier plate and even of the entire lining holder can occur.

Here, the mounting of the lining elements on the carrier plate is designed in such a way that they lie on the brake disk with a surface pressure which is constant over the surface area.

Since, however, the local sliding velocity is not constant over the element surface area, each of the lining elements is also prone to oblique wear.

If the oblique wear is too great within a lining element or else within a group element, this can lead to single-sided contact of the lining elements on the carrier plate or the carrier plates on the lining carrier. As a result, the desired uniform distribution of force is impaired, as a result of which the contact pattern of the brake lining deteriorates.

Here, the performance of a disk brake is limited, inter alia, by the surface temperature which occurs on the friction face of the brake disk. In this way, hot cracks which grow at an excessive surface temperature occur, which hot cracks can reach impermissible sizes and can make a replacement of the brake disk necessary as a result.

The greater the fluctuations in the surface temperature on the brake disk, the lower the thermal energy which a brake disk can absorb without damage during a braking operation. Accordingly, a brake lining of optimum design introduces the thermal energy into the brake disk uniformly over the entire friction face, without producing relatively great temperature differences (for example, hotspots) on the surface.

In order to comply with the abovementioned requirements, the brake linings of rail vehicles, in particular of high speed trains, are of very complicated construction, with the result that they, as a wear part, cause a considerable proportion of the operating costs of rail vehicles of this type.

The wear of a brake lining is, inter alia, substantially dependent on the surface pressure between the brake lining and the brake disk and on the sliding velocity of the brake disk on the friction linings.

$$v' \sim P^\alpha \cdot v^\beta,$$

where
v' is the wear speed
P is the surface pressure
v is the sliding velocity, and
α, β are material parameters
[Saumweber, Gerum: "Grundlagen der Schienenfahrzeugbremse" [Foundations of the rail vehicle brake], Hestra-Verlag]

For the abovementioned reasons, oblique wear of the brake linings often occurs during operation of rail vehicles of this type. Therefore, the brake linings often have to be replaced, without it being possible to completely utilize the existing wear volume of the brake linings

SUMMARY

Disclosed embodiments provide a brake lining for rail vehicles, an arrangement of a brake lining of this type on a lining holder of a brake disk arrangement of a rail vehicle, and a method for actuating a brake lining which is secured on a lining holder of a brake disk arrangement of a rail vehicle, by way of which wear is achieved which proceeds as uniformly as possible over the entire lining surface area, in order to utilize the existing wear volume in an optimum manner, to prevent premature replacement of the brake lining on account of obliquely wearing elements or element groups, and to obtain a uniform input of heat from the lining elements into the brake disk independently of the wear state of the lining elements, by way of a uniform contact pattern being maintained.

This may be achieved by way of a brake lining for a rail vehicle in accordance with the disclosed embodiments, an arrangement of a brake lining of this type on a lining holder of a brake disk arrangement of a rail vehicle having various disclosed features, and a method for actuating a brake lining which is secured on a lining holder of a brake disk arrangement of a rail vehicle having various disclosed features.

BRIEF DESCRIPTION OF FIGURES

In the following text, exemplary embodiments will be described in greater detail using the appended drawings, in which.

DETAILED DESCRIPTION

Figure 1:
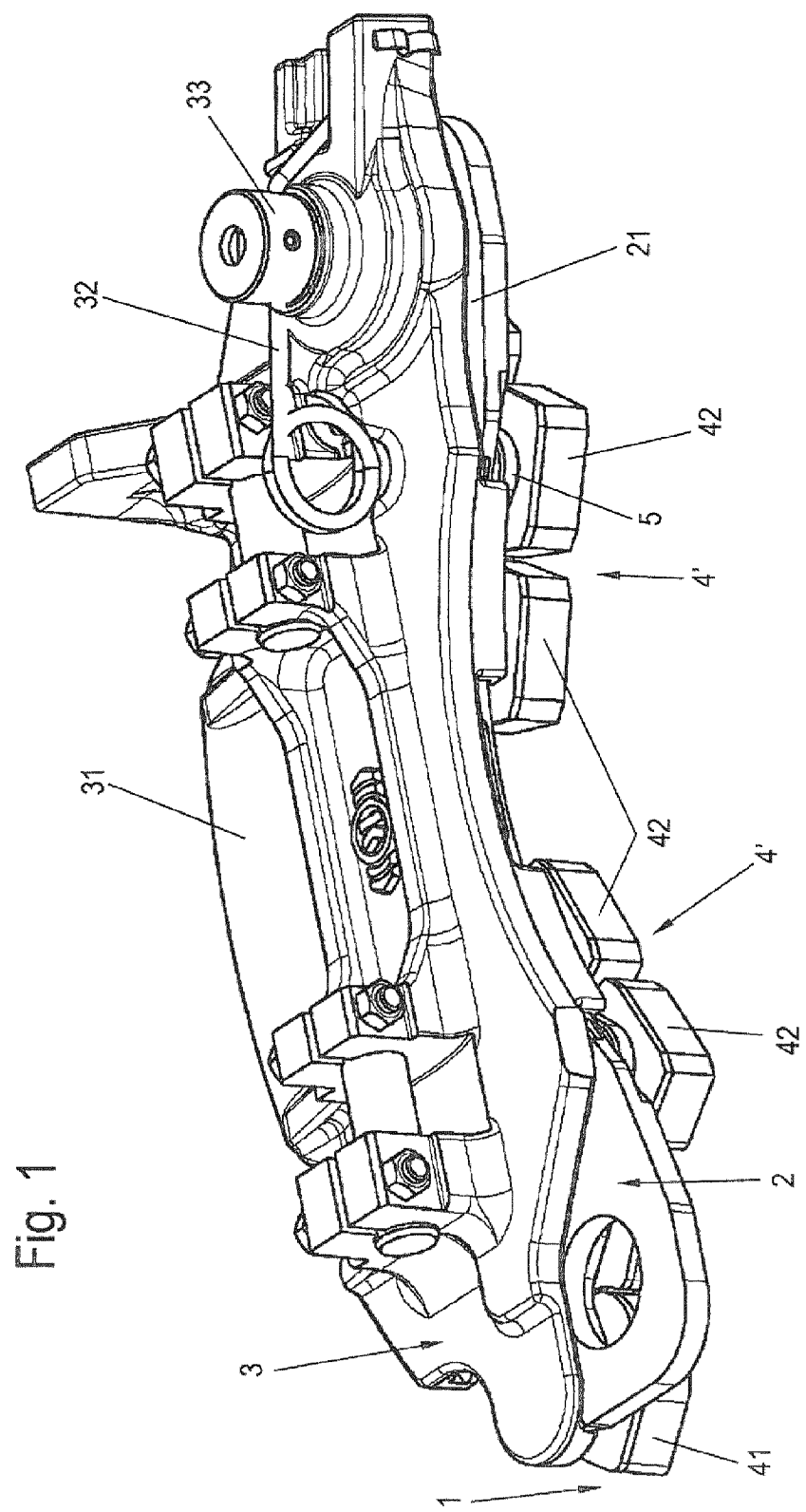
FIG. 1 shows a perspective view of one design variant of a brake lining according to disclosed embodiments, which is fixed on a lining holder.

In the case of the brake lining according to the disclosed embodiments for a partially lined disk brake of a rail vehicle, which brake lining has a lining carrier and a plurality of group elements which are arranged on the lining carrier, each of the group elements consisting of a carrier plate and a plurality of lining elements which are arranged on the carrier plate, lining elements having at least two friction faces of different size being arranged on the respective carrier plates, and the lining elements being arranged in their total area at least approximately in a circular ring sector, at least two first and second group elements which are different from one another are arranged on the lining carrier.

Here, the different group elements differ from one another in that, in the case of the first group elements, the number of lining elements with a larger friction face is greater than the number of lining elements with a smaller friction face. In the case of the second group elements, the number of lining elements with a larger friction face is lower than the number of lining elements with a smaller friction face.

Here, the first group elements are arranged on the lining carrier, radially with respect to the center point of the circle, that is to say approximately with respect to the rotational axis of the brake disk, further to the outside than the second group elements.

This results in a continuous progression of the surface pressure which decreases radially from the inside to the outside, which substantially reduces the tendency for oblique wear.

Moreover, the arrangement makes it possible to arrange the individual lining elements as close as possible to one another. Here, the individual lining elements have contours which are adapted to one another, as a result of which a friction face which is as great as possible is produced which ensures a more uniform input of heat into the brake disk surface.

In accordance with one design variant, the lining elements are arranged on the carrier plates in such a way that a plane of symmetry of each of the group elements is oriented at least approximately radially with respect to the center point of an imaginary circle which contains the circular ring sector, the center point of the circle corresponding to the rotational axis of a brake disk of the partially lined disk brake in the mounted state of the brake lining. As a result, firstly, a surface pressure is achieved which decreases radially from the inside toward the outside. In addition, the orientation of the plane of symmetry in the above-described way makes it possible to increase the friction face of the lining elements, which has a positive effect on the wear of the brake lining, in relation to the braking energy, on account of a more uniform and therefore lower surface temperature on the brake disk.

In order to further reduce the oblique wear, in accordance with a further design variant, at least two of the lining elements of a group element in a friction face of identical size are arranged at least approximately on an imaginary first circle line of the circular ring sector, and at least one lining element of the group element is arranged at least approximately on an imaginary second circle line of the circular ring sector, on the lining carrier via the carrier plate.

In one design variant, each of the group elements has three lining elements.

In order to further promote a uniform contact pattern of the lining, all the lining elements with a larger friction face of the first group elements are arranged at least approximately on the common imaginary first circle line of the circular ring sector.

This optionally also applies correspondingly to all the lining elements with a small friction face of the second group elements, which lining elements are arranged at least approximately on the common imaginary second circle line of the circular ring sector.

A surface ratio of the lining elements with a smaller friction face to the lining elements with a larger friction face of between 0.7 and 0.9, particularly optionally between 0.81 and 0.83, has proven particularly advantageous.

The arrangement according to the disclosed embodiments of a brake lining of the partially lined disk brake of a rail vehicle on a lining holder of the brake disk arrangement of the rail vehicle is distinguished here by a brake lining which is configured as above.

In the following description of the figures, terms such as top, bottom, left, right, front, rear, etc. relate exclusively to the exemplary illustration and position selected in the respective figures of the brake lining, the lining elements, the carrier plates, the lining carrier, the lining holder and other parts. The terms are not to be understood to be restrictive, that is to say the references can change as a result of different operating positions or the mirror-symmetrical design or the like.

In FIG. 1, one design variant of a brake lining according to the disclosed embodiments is denoted overall by the designation 1. Here, the brake lining of a partially lined disk brake of a rail vehicle is fixed during use to a lining holder 3 of the rail vehicle.

As can be seen in FIGS. 1 to 4, a brake lining of this type for a partially lined disk brake of a rail vehicle has a lining carrier 2 which can be fixed on the lining holder 3, and a plurality of group elements 4, 4' which are arranged on the lining carrier 2.

Here, each of the group elements 4, 4' consists substantially of a carrier plate 5 and a plurality of lining elements 41, 42 which are mounted on it.

Figure 2:
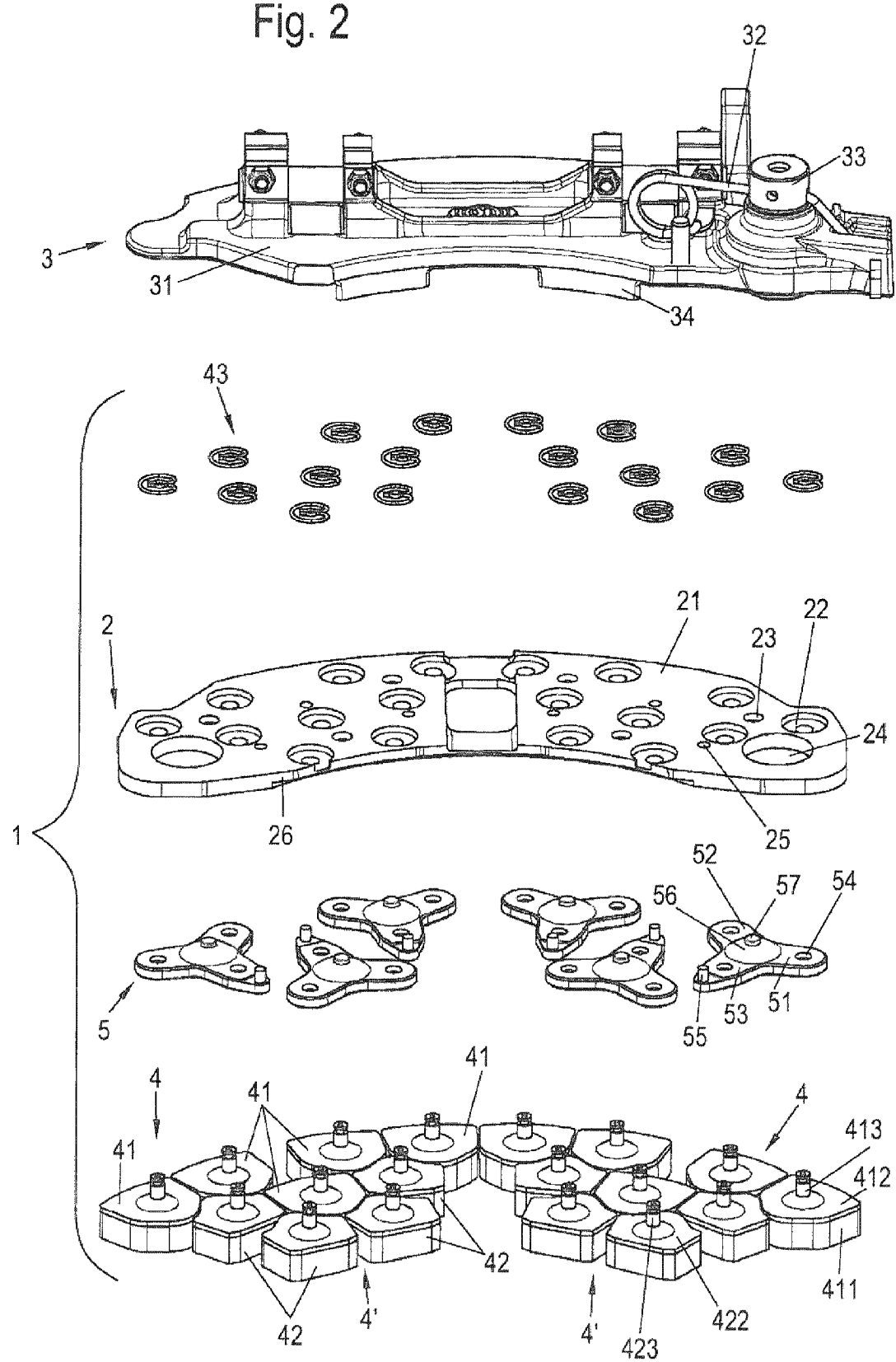
FIG. 2 shows a perspective exploded view of the brake lining which is shown in FIG. 1, FIGS. 3 and 4 show plan views of one design variant of a brake lining according disclosed embodiments having group elements with lining elements of different size.
Figure 5:
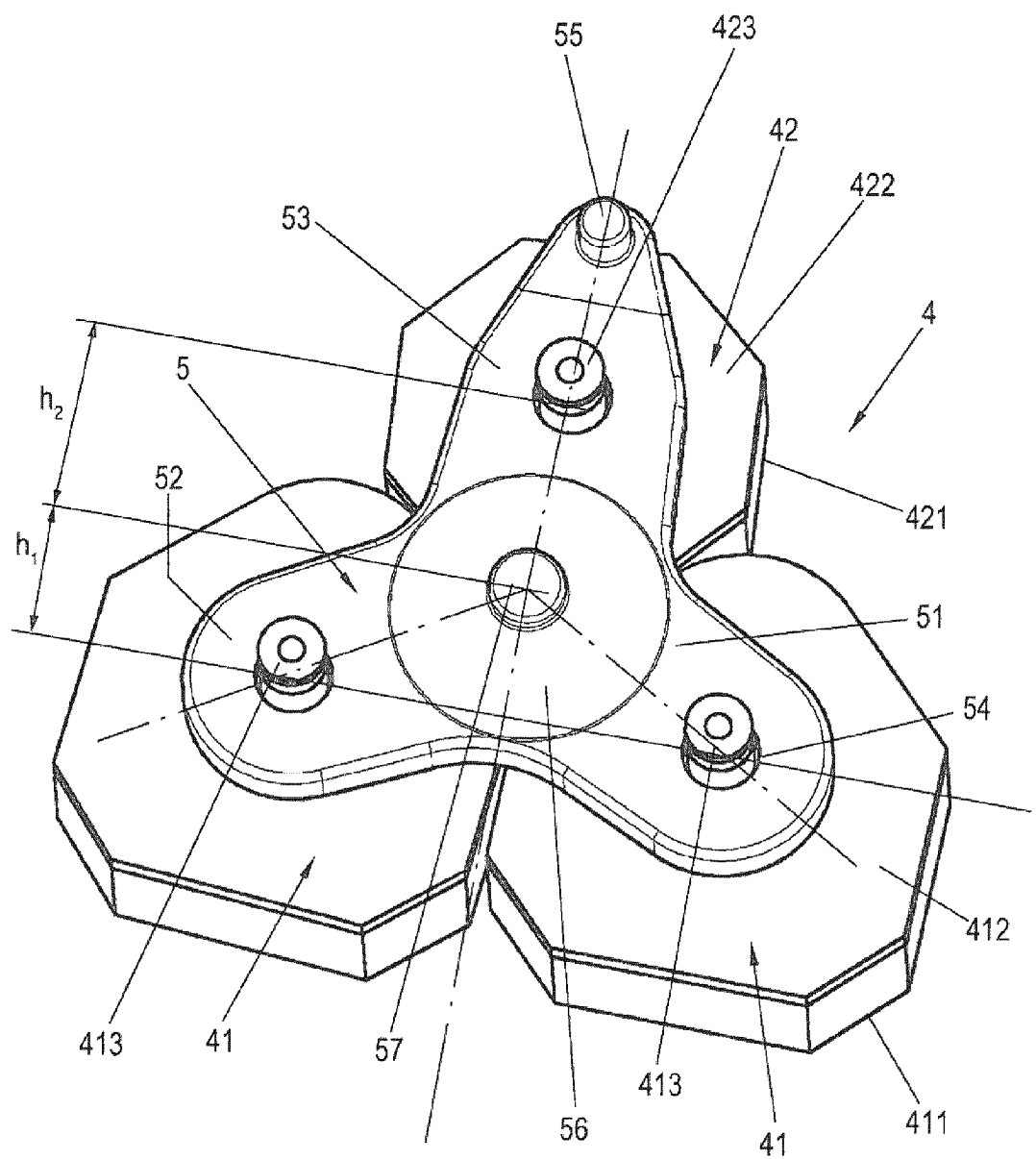
FIG. 5 shows a perspective view of a group element.

As shown in FIGS. 2 and 5, the lining elements 41, 42 are optionally mounted spherically on the carrier plates 5. The carrier plates 5 themselves are optionally likewise mounted spherically on the lining carrier 2.

Figure 3:
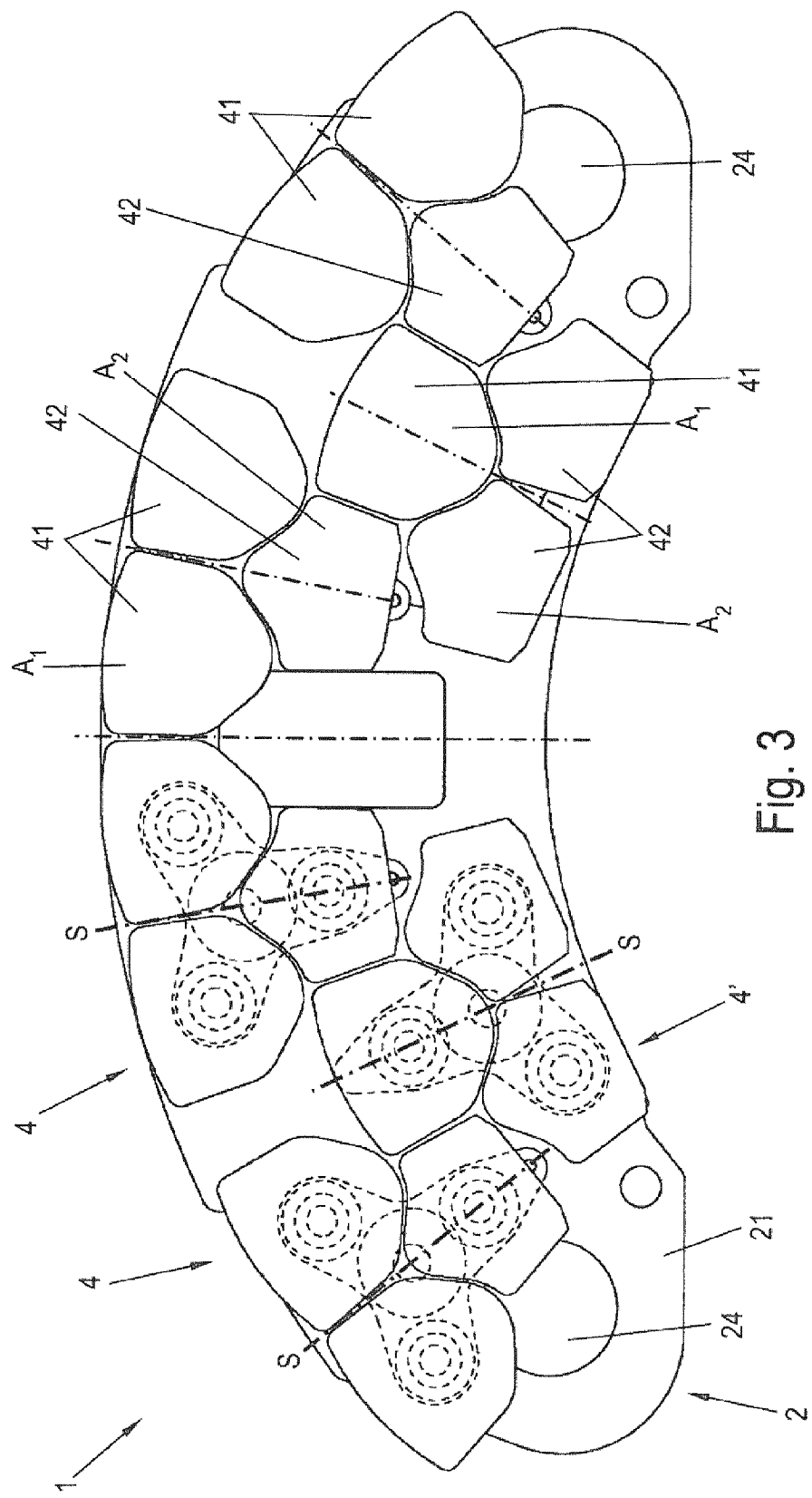
Figure 4:
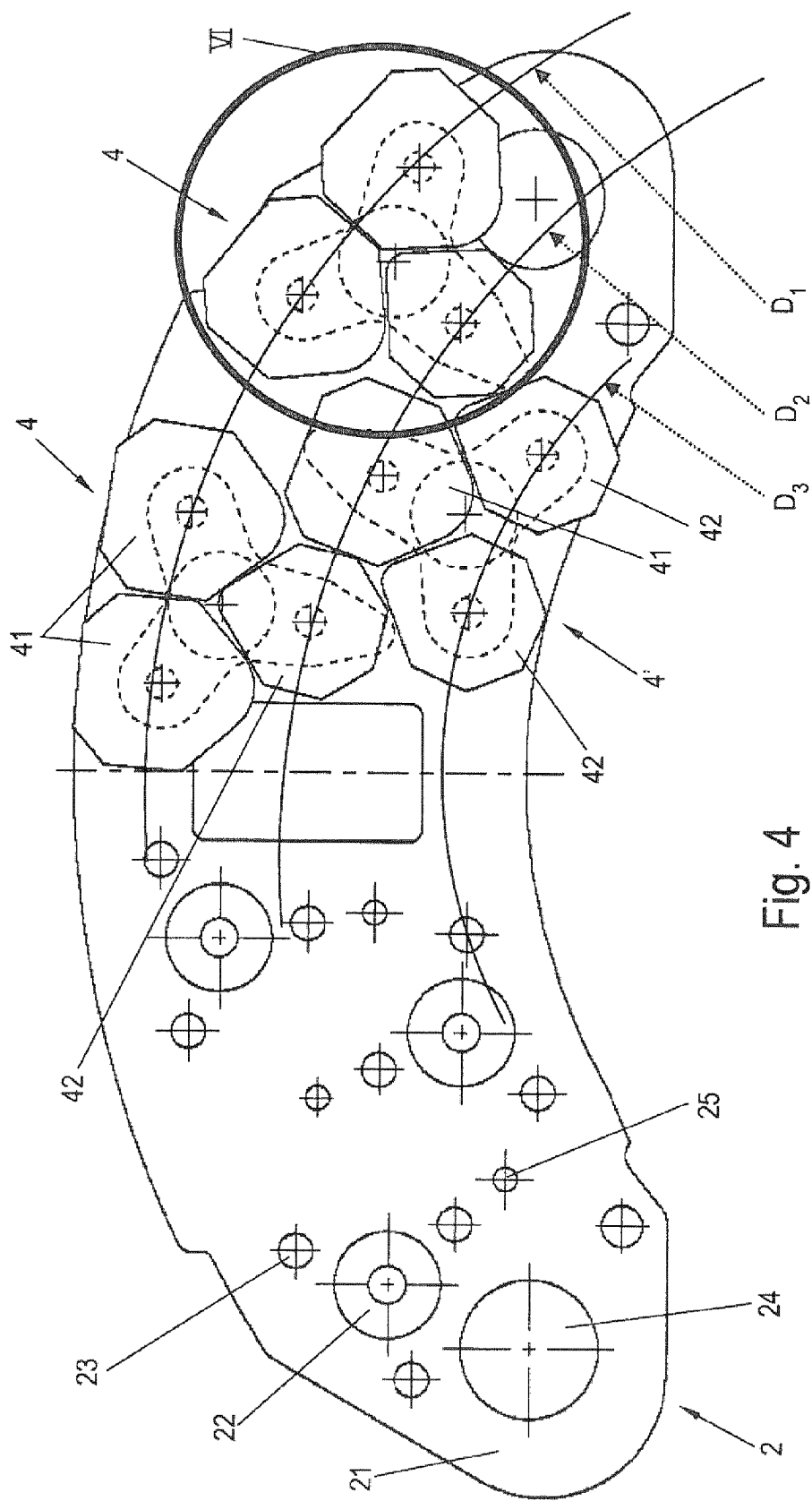

In each case three of the lining elements 41, 42 are optionally arranged on a carrier plate 5, as shown by way of example in FIG. 3.

Here, the mounting of the lining elements 41, 42 via the carrier plates 5 on the lining carrier 2 takes place in such a way that a brake application force $F_Z$ surface pressure P, produced during pressing of the lining elements 41, 42 on a brake disk (not shown), of the lining elements 41, 42 decreases radially with respect to the rotational axis of the brake disk at an increasing spacing of the lining elements 41, 42 from the rotational axis of the brake disk.

The carrier plates 5 have bearing elements 56 for spherical mounting of the carrier plates 5 on the lining carrier 2, which bearing elements 56 are optionally configured as spherical caps with cams 57 which rise centrally from it, the respective bearing elements 56 lying in correspondingly shaped spherical recesses 22 on that side of a plate 21 of the lining carrier 2 which faces away from the lining holder 3. The cams 57 of the carrier plates extend into bores 23 of the carrier plate 22 which are provided to this end. By way of an additional positively locking connection, the cams 57 prevent that spherical part of the bearing element 56 which is configured here as a spherical face from sliding out of the spherical cap of the lining carrier 2 if an unexpectedly high frictional force or another, high and correspondingly directed force (for example, as a result of damage to the brake disk) occurs.

Here, as can be seen clearly in FIG. 5, the carrier plates 5 themselves are optionally configured with fingers 51, 52, 53 which extend from the bearing element 56 and in which cutouts 54 for receiving the bearing elements 413, 423 of the lining elements 41, 42 are provided.

In addition to the spherical mounting of the carrier plates 5 via the spherically shaped bearing element 56, a further cam 55 is optionally integrally formed at one end of one of the fingers 51, 52, 53 on that side of the carrier plate 5 which is assigned to the lining carrier 2, which further cam 55 extends into a correspondingly shaped recess 25 of the carrier plate 2.

Other shapes of the carrier plates 5 are also conceivable, however. It is important to design the carrier plates 5 in such a way that a tilting movement with respect to the lining carrier 2 is made possible.

Here, the cutouts 54 are shaped spherically on their sides which face away from the carrier plate 2 and face the lining elements 41, 42, 43. A through hole is provided centrally in the spherical part of the recess, through which through hole the bearing elements 413, 423 of the lining elements 41, 42, 43 extend into recesses 22 which are provided for this purpose in the lining carrier 2, and are secured in them resiliently by way of spring elements 43, for example in the form of disk springs or shaped springs.

The radial spacing $h_1$ from the lining elements 41 which are further away radially with respect to the rotational axis of the brake disk is lower than the spacing $h_2$ from the cutout 54 for a lining element 42 which is closer radially to the rotational axis of the brake disk.

As can be seen clearly in FIG. 2, the lining elements 41, 42 are arranged on the carrier plate 5 in such a way that a plane of symmetry S of each of the group elements 4, 4' is oriented at least approximately radially with respect to the center point of an imaginary circle which contains the circular ring sector.

Here, the center point of the circle corresponds to the rotational axis of the brake disk in the mounted state of the brake lining 1 on the partially lined disk brake.

As can be seen clearly, furthermore, in FIGS. 2 and 3, two group elements 4, 4' which are different from one another are arranged on the lining carrier 2 on the lining carrier 2.

Here, the first group elements 4 have two lining elements 41 with a friction face $A_1$ which is larger than the third lining element 42 with a friction face $A_2$.

As can be seen in FIGS. 2 and 3, furthermore, two of the lining elements 41, 42 of a group element 4, 4' are arranged at least approximately on an imaginary first circle line $D_1$ or $D_3$ of the circular ring sector, and at least one lining element 42, 41 of a group element 4, 4' is arranged at least approximately on an imaginary second circle line $D_2$ of the circular ring sector, on the lining carrier 2 via the respective carrier plate 5.

In principle, group elements having more than three lining elements 41, 42 are also conceivable.

In the case of the first group elements 4, the number of lining elements 41 with a larger friction face $A_1$ is greater than the number of lining elements 42 with a smaller friction face.

In the case of the second group elements 4', the number of lining elements 41 with a larger friction face $A_1$ is lower than the number of lining elements 42 with a small friction face $A_2$.

In the case of the design variant which is shown in FIGS. 1 to 4, two rows of group elements 4, 4' are arranged on the lining carrier 2 in the radial direction of the circular ring sector.

The lining elements 41 having a larger friction face $A_1$ of the first group elements 4 are optionally all arranged at least approximately on the common imaginary first circle line $D_1$ of the circular ring sector.

This optionally applies correspondingly to all lining elements 42 having a smaller friction face $A_2$ of the second group elements 4', which are arranged at least approximately on the common imaginary second circle line $D_3$ of the circular ring sector, which second circle line $D_3$ lies radially further to the inside than the first circle line $D_1$ of the circular ring sector, on which only lining elements 41 having a larger friction face $A_1$ are arranged.

The respectively third lining elements 42 of the first group elements 4 having a smaller friction face $A_2$ and the respectively third lining elements 41 of the second group elements 4' having a larger friction face $A_1$ are optionally all arranged at least approximately on the common imaginary second circle line $D_2$ of the circular ring sector.

The surface area ratio $A_2/A_1$ of the lining elements 42 having a smaller friction face $A_2$ to the lining elements 41 having a larger friction face $A_1$ is optionally between 0.7 and 0.9. The surface area ratio $A_2/A_1$ is particularly optionally between 0.81 and 0.83.

In order to achieve a uniform wear speed of all lining elements 41, 42, the surface area ratio $A_1/A_2$ of the lining elements 41, 42 of different size on one carrier plate 5 is determined based on the orbital path diameter $D_1$, $D_2$, on which respective lining elements 41, 42 are arranged on the lining carrier 2, and the parameters α and β from the wear law $$A_1/A_2 = (D_1/D_2)^{\beta,\alpha}.$$

This results in a lower surface pressure in the case of the radially outer lining elements 41 on account of their larger friction face, in the case of a brake application force $F_Z$ which is distributed uniformly to the lining elements 41, 42 of a carrier plate 5.

Here, the uniform distribution of the brake application force $F_Z$ to the individual lining elements 41, 42 takes place by way of a suitable selection of the arrangement of the lining elements 41, 42 on the carrier plate 5.

If the group element 4 which is shown in FIG. 3 is considered, the two lining elements 41 of identical area are spaced apart radially from the bearing point of the group element 4 at a spacing $h_1$, whereas the further lining element 42 is spaced apart radially from the bearing point of the group element 4 at a spacing $h_2$.

Moreover, the two lining elements 41 are arranged symmetrically with respect to an axis of symmetry which is laid through the bearing point of the group element 4 and the cam 55. As a result, the forces which act on the two lining elements 41 are identical.

Accordingly, the following applies to the force which acts on the further lining element 42:

$$F_{42} = 2 \cdot F_{41} \cdot \frac{h_1}{h_2}$$

where $h_2 = 2 \cdot h_1$, it follows that $F_{42} = 2 \cdot F_{41} \cdot \frac{h_1}{2 \cdot h_1} = F_{41}$.

The method according to the disclosed embodiments for actuating a brake lining 1 for a partially lined disk brake of a rail vehicle, which brake lining 1 is secured on a lining holder 3 of a brake disk arrangement of a rail vehicle, having a plurality of lining elements 41, 42 which are mounted spherically on a lining carrier 2 via carrier plates 5, is distinguished by the fact that, when the brake lining 1 is loaded with a brake application force, the brake application force is distributed to the lining elements 41, 42 in such a way that the surface pressure which acts on the lining elements 41, 42 decreases as the radial spacing increases from the rotational axis of the brake disk.

As a result of the surface pressure via all the above-described functional groups (lining elements 41, 42, group elements 4, 4', entire brake lining 1), which surface pressure is reduced continuously as the spacing increases from the rotational axis of the brake disk, a tendency for oblique wear of the lining elements 41, 42 is reduced substantially.

As a result, a more uniform contact pattern of the brake lining 1 over the entire wear height is achieved. A more uniform introduction of heat into the brake disk surface is made possible even in the case of advanced lining wear, as a result of which the thermal loading of the brake disk is reduced.

The wear of the brake lining in relation to the braking energy is also reduced on account of a more uniform and therefore lower surface temperature on the brake disk.

On its side which faces away from the lining carrier 2, the lining holder 3 has a spring clip 32 and a pin 33 which can be braced by way of the former and engages through a plate 31 of the lining holder 3 into a recess 24 which is provided to this end in the plate 21 of the lining carrier 2.

LIST OF DESIGNATIONS

Brake lining
Lining carrier
21 Plate
22 Recess
24 Recess
Lining holder
31 Plate
32 Spring clip
33 Pin
34 Wraparound web
4, 4' Group element
41 Lining element
411 Friction lining
412 Lining plate
413 Bearing element
42 Lining element
421 Friction lining
422 Lining plate
423 Bearing element
43 Spring element
5 Carrier plate
51 Finger
52 Finger
53 Finger
54 Cutout
55 Cam
56 Bearing element
57 Cam
$A_1$ Friction face
$A_2$ Friction face
$D_1$ Circle line
$D_2$ Circle line
$D_3$ Circle line
$h_1$ Spacing
$h_2$ Spacing
S Plane of symmetry

The invention claimed is:

1. A brake lining for a partially lined disk brake of a rail vehicle, the brake lining comprising:
   a lining carrier;
   a plurality of group elements which are arranged on the lining carrier, each of the group elements including a carrier plate and a plurality of lining elements arranged on the carrier plate the lining elements having at least two friction faces ($A_1$, $A_2$) of different size being arranged on the respective carrier plates, the lining elements being arranged in their total area at least approximately in a circular ring sector,
   wherein at least two first and second groups of the plurality of group elements which are different from one another are arranged on the lining carrier,
   wherein the first group elements have a number of lining elements with a larger friction face ($A_1$) greater than the number of lining elements with a smaller friction face ($A_2$),
   wherein the second group elements have a number of lining elements with a larger friction face ($A_1$) lower than the number of lining elements with a smaller friction face ($A_2$), and
   wherein the first group elements are arranged on the lining carrier radially with respect to the center point of an imaginary circle which contains the circular ring sector, further to the outside than the second group elements.

2. The brake lining of claim 1, wherein the lining elements are arranged on the carrier plates such that a plane of symmetry (S) of each of the group elements is oriented at least approximately radially with respect to the center point of the imaginary circle which contains the circular ring sector, the center point of the circle corresponding approximately to the rotational axis of a brake disk of the partially lined disk brake in the mounted state of the brake lining.

3. The brake lining of claim 2, wherein at least two of the lining elements of a group element with a friction face ($A_1$, $A_2$) of identical size are arranged at least approximately on an imaginary first circle line ($D_1$, $D_3$) of the circular ring sector, and at least one lining element of a group element is arranged at least approximately on an imaginary second circle line ($D_2$) of the circular ring sector, on the lining carrier via the carrier plate.

4. The brake lining of claim 2, wherein each of the group elements has three lining elements.

5. The brake lining of claim 1, wherein each of the group elements has three lining elements.

6. The brake lining of claim 5, wherein all the lining elements with a larger friction face ($A_1$) of the first group elements are arranged at least approximately on the common imaginary first circle line ($D_1$) of the circle ring sector.

7. The brake lining of claim 5, wherein all the lining elements with a smaller friction face ($A_2$) of the second group elements are arranged at least approximately on the common imaginary second circle line ($D_2$) of the circle ring sector.

8. The brake lining of claim 1, wherein at least two of the lining elements of a group element with a friction face ($A_1$, $A_2$) of identical size are arranged at least approximately on an imaginary first circle line ($D_1$, $D_3$) of the circular ring sector, and at least one lining element of a group element is arranged at least approximately on an imaginary second circle line ($D_2$) of the circular ring sector, on the lining carrier via the carrier plate.

9. The brake lining of claim 8, wherein each of the group elements has three lining elements.

10. The brake lining of claim 1, wherein an area ratio ($A_2/A_1$) of the lining elements with a smaller friction face ($A_2$) with respect to the lining elements with a larger friction face ($A_1$) is between 0.7 and 0.9.

11. The brake lining of claim 10, wherein an area ratio ($A_2/A_1$) of the lining elements with a smaller friction face ($A_2$) with respect to the lining elements with a larger friction face ($A_1$) is between 0.81 and 0.83.

12. An arrangement of a brake lining for a partially lined disk brake of a rail vehicle on a lining holder of a brake disk arrangement of a rail vehicle, wherein the brake lining arrangement comprises:
a lining carrier; and
a plurality of group elements which are arranged on the lining carrier, each of the group elements including a carrier plate and a plurality of lining elements arranged on the carrier plate, the lining elements having at least two friction faces ($A_1$, $A_2$) of different size being arranged on the respective carrier plates,
wherein the lining elements are arranged in their total area at least approximately in a circular ring sector, wherein at least two first and second groups of the plurality of group elements which are different from one another are arranged on the lining carrier, and
wherein the first group elements have a number of lining elements with a larger friction face ($A_1$) greater than the number of lining elements with a smaller friction face ($A_2$), the second group elements having a number of lining elements with a larger friction face ($A_1$) lower than the number of lining elements with a smaller friction face ($A_2$), and the first group elements being arranged on the lining carrier radially with respect to the center point of an imaginary circle which contains the circular ring sector, further to the outside than the second group elements.

13. A method for actuating a brake lining for a partially lined disk brake of a rail vehicle, which brake lining is secured on a lining holder of a brake disk arrangement of a rail vehicle, having a plurality of lining elements which are mounted spherically on a lining carrier via carrier plates, the method comprising:
when the brake lining is loaded with a brake application force, distributing the brake application force to the lining elements such that the surface pressure which acts on the lining elements decreases at an increasing radial spacing from a rotational axis of the brake disk,
wherein radially outer carrier plates have a number of lining elements with a larger friction face (A1) greater than the number of lining elements with a smaller friction face (A2),
wherein radially inner carrier plates have a number of lining elements with a larger friction face (A1) lower than the number of lining elements with a smaller friction face (A2).

* * * * *